United States Patent [19]
Ipponmatsu et al.

[11] Patent Number: 6,118,519
[45] Date of Patent: *Sep. 12, 2000

[54] METHOD FOR MEASURING THE FLOW OF FLUIDS

[75] Inventors: Masamichi Ipponmatsu, Hyogo-ken; Masashi Nishigaki, Osaka-fu; Akira Hirano, Hyogo-ken; Tsuyoshi Nakajima, Hyogo-ken; Yuji Ikeda, Hyogo-ken; Minoru Suzuki, Osaka-fu; Tsuyoshi Tsurutani, Hyogo-ken, all of Japan

[73] Assignee: Osaka Gas Company Limited, Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/708,906

[22] Filed: Sep. 5, 1996

Related U.S. Application Data

[63] Continuation of application No. 08/283,476, Jul. 22, 1994, abandoned, which is a continuation of application No. 07/841,913, Feb. 25, 1992, abandoned.

[30] Foreign Application Priority Data

| Mar. 1, 1991 | [JP] | Japan | 3-36235 |
| Aug. 5, 1991 | [JP] | Japan | 3-195472 |
| Aug. 28, 1991 | [JP] | Japan | 3-217327 |
| Aug. 28, 1991 | [JP] | Japan | 3-217335 |

[51] Int. Cl.[7] ............................................ G01F 1/708
[52] U.S. Cl. ................................ 356/28; 73/861.05
[58] Field of Search ........................ 356/28; 73/861.05

[56] References Cited

U.S. PATENT DOCUMENTS

| 4,264,330 | 4/1981 | Schmidt et al. |
| 4,664,513 | 5/1987 | Webb et al. ........................ 356/28 |
| 4,804,268 | 2/1989 | Mohnsen et al. ............... 356/28 X |
| 4,805,811 | 2/1989 | Wetterlin ............................ 222/337 |
| 4,988,191 | 1/1991 | Adrian et al. ....................... 356/28 |
| 5,029,999 | 7/1991 | Kremer et al. ................. 356/28.5 X |
| 5,054,913 | 10/1991 | Ishikawa et al. ................. 356/28.5 |

OTHER PUBLICATIONS

Principles and Practice of Laser–Doppler Anemometry, F. Durst, A., Melling and J.H. Whitelaw, pp. 1–5, 1976, London and New York.

Third International Symposium on Applications of Laser Anemometry to Fluid Mechanics, Jul. 7–9, 1986, pp. 5.1(1–6), Lisbon, Portugal.

Scavenging Flow Measurements in a Fired Two–Stroke Engine by Fiber LDV, Yuji Ikeda et al, SAE International Congress and Exposition, Detroit, Michigan, Feb. 25 –Mar. 1, 1991, pp. 63–71.

Journal of Physics E: pyrometer for the statistical measurement of the surface temperature of particles under thermal plasma conditions.

Proceedings of the Eleventh International Cryogenic Engineering Conference, ICEC, Apr. 22, 1986, Berling, Germany, pp. 582–586, M. Murakami et al "Application of flow visualization and laser Doppler velocimetry to cryogenic fluids".

*Applied Optics*, vol. 14, No. 4, Apr. 1975, USA, pp. 894–901 M. K. Mazumder et al "Flow Tracing Fidelity of Scattering Aerosol in Laser Doppler Velocimetry".

*Experiments In Fluids*, vol. 1, No. 4, 1983, Wurzberg, Germany, pp. 195–203, E. C. Baroth et al "Investigation of Supersonic Separated Flow in a Compression Corner by Laser Doppler Anemometry".

*Primary Examiner*—Mark Hellner
*Attorney, Agent, or Firm*—Jordan and Hamburg LLP

[57] ABSTRACT

The disclosed method of measuring the flow of a fluid with a porous particulate ceramic tracer and an optical instrument is characterized in that spherical particles having diameters in the range of 0.5 to 150 $\mu$m are used as the tracer. Inasmuch as the tracer particles for flow measurement are spherical, the sectional area of scattered light to be detected by an optical sensor means is constant regardless of the orientation of particles. Furthermore, spherical particles have no surface irregularities that might cause concatenation so that individual particles are not agglomerated in tracking a fluid flow, thus contributing to improved measurement accuracy.

15 Claims, 21 Drawing Sheets

Fig. 18 Particle diameter distributions. (a) new high-performance tracer particles.

Particle diameter distributions. (b) conventional TiO$_2$ tracer particles.

Particle diameter distributions. (c) conventional SiO₂ tracer particles.

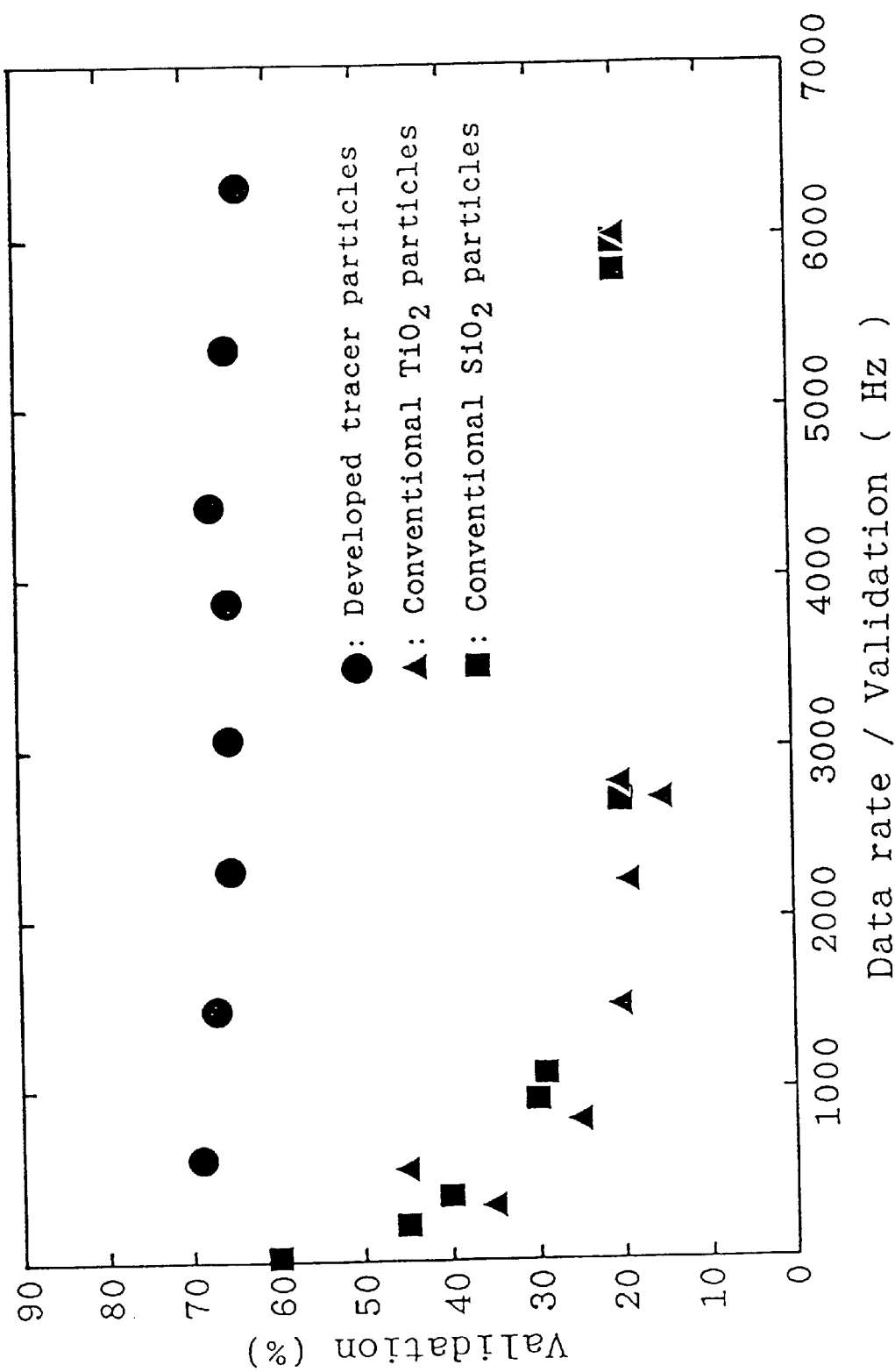

METHOD FOR MEASURING THE FLOW OF FLUIDS

This application is a continuation, of application Ser. No. 08/283,476 filed Jul. 22, 1994, now abandoned, which is a continuation of application Ser. No. 07/841,913 filed Feb. 25, 1992, now abandoned.

TECHNICAL FIELD

The present invention relates to a method for measuring the flow of fluids, herein after referred to as "flow measurement". It should, however, be understood that the term "flow measurement" as used throughout this specification means not only a measurement of the flow velocity of a gas, such as air, fuel gas, etc., or a liquid, such as water, liquefied gas, etc., but also a topological visualization of the distribution of such gas or liquid.

BACKGROUND OF THE INVENTION

Prior Art

The particles heretofore used as tracer particles in optical flow measurements are porous particles made of $SiO_2$, $TiO_2$, SiC or the like which are obtainable by a coprecipitation process or from a natural material such as the mineral ore. These particles generally have a mean particle diameter of about 0.5 to 150 µm.

In a measurement of the flow velocity using a laser device such as a laser Doppler velocimeter, a phase Doppler velocimeter or the like, tracer particles somewhere between 0.5 and 10 µm in mean diameter, in particular, have so far been employed.

In technologies involving a visualization of a flowing fluid by photographing the distribution of tracer particles in the fluid with the aid of an instantaneous, powerful light source, such as a flash-light or a pulse laser, and a determination of the flow pattern from the resulting picture, particles somewhere between about 5 µm and about 150 µm in mean diameter are generally employed.

Electron microphotographs of the representative tracer particles which are conventionally employed are presented in FIGS. 3 through 14; viz. white carbon in FIGS. 3 and 4, $TiO_2$ in FIGS. 5 and 6, talc in FIGS. 7 and 8, $TiO_2$-talc in FIGS. 9 and 10, particles from kanto loam, and white alumina in FIGS. 13 and 14.

However, as apparent from these microphotographs, the conventional tracer particles have the following drawbacks, 1) through 5), which amplify the measurement error.
1) Because the tracer particles are morphologically not uniform, the sectional area of scattered light to be detected varies according to the real-time orientation of each particle.
2) Because the particle size distribution is broad and the sectional area of light scattering varies with different individual particles, the comparatively large particles scatter light in two or more fringe at a time.
3) Because the apparent specific gravity of the particulate tracer differs markedly from that of the fluid to be measured, the particles do not faithfully follow the on-going flow of the fluid.
4) Because the particle size distribution is broad and the apparent specific gravity also has a distribution, the particles follow the fluid flow with varying efficiencies to prevent accurate quantitation of the flow measurement.
5) Because the surface of the particle is irregular, the individual particles tend to be concatenated with each other to increase the effective particle size.

The technique used generally for launching tracer particles into a fluid comprises either extruding tracer particles from a screw feeder and driving them into the body of the fluid with the aid of an air current or suspending tracer particles in a solvent and ejecting the suspension in a mist form using an ultrasonic humidifier. In any of the above methods, the rate of feed of the tracer particles is not constant so that the accuracy of flow measurement is inevitably sacrificed.

OBJECTS OF THE INVENTION

It is the object of the present invention to overcome the above-mentioned drawbacks and provide a method of flow measurement with improved accuracy.

SUMMARY OF THE INVENTION

The method of flow measurement according to the invention comprises measuring the flow of a fluid using an optical instrument and a porous particulate ceramic tracer, the diameter of which is 0.5 to 150 µm.

In another aspect, the method of flow measurement according to the invention comprises feeding a non-agglomerating particulate tracer to an optical instrument, such as a laser device, from a measuring wheel particle feeder.

The method of flow measurement according to the invention comprises measuring the flow of a fluid using an optical instrument and a porous particulate ceramic tracer, said porous particulate ceramic tracer consisting of spherical particles having a diameter of 0.5 to 150 µm. Particularly in the method of measuring the flow velocity using a laser instrument such as a laser Doppler velocimeter, spherical ceramic particles having a diameter of 0.5 to 10 µm are preferred from the viewpoint of relation with fringe. A more satisfactory spherical particle diameter range is 1.5 to 2.5 µm. In flow measurement which involves photographing, the use of spherical particles having a diameter of 5 to 150 µm is preferred from the viewpoint of detecting light and flowing the fluid flow. A more satisfactory particle diameter range is 30 to 100 µm.

When the tracer particles for use in flow measurement with an optical instrument are spherical as in the invention, the sectional area of scattered light to be detected by a photosensor or the like is constant regardless of the orientation of particles at the moment of detection. Moreover, because such particles have no surface irregularities that may cause concatenation, it does not happen that two or more tracer particles flow as concatenated through the body of the fluid. Therefore, the accuracy of flow measurement is improved.

Where the fluid to be measured is a gas, said tracer particles are preferably of hollow structure.

When the tracer particles are hollow, the specific gravity of the particles is so low that even if the particle size is not critically uniform, they may readily follow the gas flow. Therefore, the accuracy of gas flow measurement is improved. The improved accuracy of measurement afforded by such hollow spherical particles over that attainable with solid spherical particles is more remarkable when the flow rate of the fluid is high.

The shell thickness of such hollow spherical particles is not so critical but is preferably in the range of one-third to one-tenth of the diameter of the particle. If the shell thickness is less than one-tenth of the particle diameter, the particles tend to be collapsed in use. Conversely when the shell is thicker than one-third of the particle diameter, the advantage of the hollow structure will not be fully realized.

Where the fluid to be measured is a liquid, said tracer is preferably a porous particulate ceramic tracer having closed pores with a porosity of not less than 0.1 cm$^3$/g.

When the tracer particles have closed pores with a porosity of not less than 0.1 cm$^3$/g, the specific gravity of the tracer particles can be changed so as to minimize the differential from the specific gravity of the fluid to be measured, thereby making it easier for the particles to follow the dynamics of the fluid. In this manner, the accuracy of flow measurement can be further improved.

Where the fluid to be measured is a liquid, tracer particles coated with a metal are used with advantage.

When such metal-clad porous spherical particles are used for the flow measurement of a liquid, the intensity of reflected light is greater than it is the case when bare particles are employed so that the accuracy of flow measurement is improved. However, since such metal-clad particles are higher in specific gravity and expensive, they are preferably used where the conditions of measurement specifically call for the use of such particles.

Particularly preferred are metal-clad porous ceramic tracer particles having closed pores with a porosity of not less than 0.1 cm$^3$/g. Application of a metal cladding increases the specific gravity of particles as mentioned above but the adverse effect of increased specific gravity can be minimized by using porous ceramic particles having closed pores with a porosity of not less than 0.1 cm$^3$/g.

For application of a metal cladding, any of the electroless plating, electrolytic plating, CVD, vapor deposition and other techniques can be utilized but the electroless plating process is preferred in that a uniform cladding can be easily obtained (Claim 7).

The cladding metal includes, among others, Ni, Pt, Co, Cr, etc. but nickel is preferred in that a quality cladding can be easily obtained by electroless plating and that the resultant cladding is comparatively high in chemical resistance.

The thickness of the metal cladding is not critical but is preferably within the range of 0.05 to 5 μm. If the cladding thickness is less than 0.05 μm, the effect of increased reflectance is hardly obtained. If the cladding is over 5 μm in thickness, the proportion of the metal in the whole particle is too large so that the bulk specific gravity of the tracer is increased.

The starting material for said particulate tracer or for the ceramic part of said metal-clad particulate tracer is not limited in variety only if it is chemically stable. Thus, the starting material can be selected from among, for example, alkaline earth metal carbonates such as calcium carbonate, barium carbonate, etc., alkaline earth metal silicates such as calcium silicate, magnesium silicate, etc.; and metal oxides such as silica (SiO$_2$), iron oxide, alumina, copper oxide and so on. Among these materials, SiO$_2$ is particularly desirable in that it is commercially available at a low price and resistant to heat. When the heat resistance of the ceramic material is high, particles prepared therefrom can be effectively used without the risk of breakdown even in high-temperature fluids.

The size distribution of tracer particles is preferably as narrow as possible but when not less than 70% of the particles have diameters within the range of ±50% of the mean particle diameter, there is obtained a substantially uniform sectional area of scattered light. Moreover, the kinetics of tracer particles in the fluid body, that is to say the pattern of following the fluid flow, are then rendered substantially uniform.

The tracer particles of the invention can be applied to the measurement of fluids flowing at high speeds. Thus, in the conventional flow measurement using a laser Doppler device, an attempt to increase the sample data rate (the number of data generated per unit time) by increasing the flow rate of the fluid and, hence, the number of tracer particles passing through the fringe per unit time resulted in a decrease in the mean effective data rate, which is a representative indicator of measurement accuracy, thus making it difficult to achieve an accurate measurement of a high-velocity fluid. In accordance with the present invention, the mean effective data rate is high even at a high sample data rate so that the method can be effectively applied to the measurement of fluids flowing at high speeds.

Furthermore, in the conventional flow measurement, the concentration of tracer particles cannot be increased over a certain limit because an increased feed of tracer particles for generating a larger number of data per unit time should adversely affect the mean effective data rate. However, in the method of the invention, increasing the rate of feed of tracer particles for increasing the sample data rate does not sacrifice the mean effective data rate, with the result that the desired measurement can be performed with an increased tracer concentration.

The particulate tracer or the ceramic core of the metal-clad particulate tracer can be easily manufactured at low cost by the reversed micelle technology which provides spherical or hollow spherical porous tracer particles.

In this connection, when an aqueous solution of the precursor for the tracer material is extruded from a porous glass or polymer membrane having substantially uniform pores in an organic solvent, there can be obtained uniform particles with a narrow size distribution, and such particles are well suited for use as the tracer particles or the core of metal-clad tracer particles.

The above-mentioned porous glass or polymer membrane may be any of the known membranes such as the membrane obtainable by subjecting borosilicate glass to phase separation and washing the product with a pickling acid solution, the membrane obtainable by mixing a silica sol with a water-soluble organic polymeric material, subjecting the mixture to phase separation at polymerization and rinsing the product, and the membrane obtainable by a technology involving irradiation with laser light to give perforations of substantially uniform diameter.

The tracer particles can be advantageously fed to the laser instrument by means of a measuring wheel particle feeder.

When the tracer particles are fed from the measuring wheel particle feeder, the particles can be delivered quantitatively so that the accuracy of velocity measurement or photographic distribution measurement is further improved. Moreover, in the conventional method, for obtaining of the high measurement accuracy, it is essential to recalibrate the instrument after each measurement cycle for minimizing the measurement error. This operation is eliminated by use of the measuring wheel particle feeder so that as many more measurements can be performed within a given time period.

The construction of the measuring wheel particle feeder and the mechanism of feed are described below, referring to FIGS. 15 and 16. As illustrated, a feeder body 101 is internally provided with a disk 102 which is driven by a motor not shown. The top surface of this disk 102 is provided with a circumferential groove 103.

The reference numeral 104 indicates a hopper which is filled with a particulate tracer F. The hopper 104 has a lower portion 104a which is tapered towards the discharge end of the hopper and the lowest part 104b thereof is open in the form of an orifice 104c immediately over the groove 103, so that the particulate tracer F in the hopper 104 may flow through the orifice 104c into the circumferential groove 103.

The reference numeral 107 indicates a blow nozzle made of plate material. This blow nozzle 107 is configured as a sector in plan view and has a recess 109 having a tapered lateral surface 108 in a substantial center thereof. This recess 109 is centrally provided with an orifice extending in the direction of the thickness for passage of tracer particles (FIG. 16).

The reference numeral 105 indicates a particle duct which runs through a casing 106 of the feeder body 101 and through which the inside of the feeder body 101 is made communicable with the outside thereof. This particle duct 105 is attached to the top of the blow nozzle 107 in such a manner that its inward end 105a covers said recess 109 to establish communication with said particle duct 110.

The atmospheric pressure within the feeder body 101 is maintained at a level higher than the external atmospheric pressure. Because of this pressure gradient, the air flows into the circumferential groove 103 adjacent said blow nozzle 107 at point X beneath the blow nozzle 107. The air then flows out through a particle passageway 110, said recess 109 and said particle duct 105. The arrowmarks in FIG. 16 indicate the flow of air.

As the particles F are carried by such an air flow, they are successfully metered out from the feeder body 101 into the body of the fluid to be measured.

In a second aspect, the invention provides a method of flow measurement using an optical instrument and a particulate tracer material, wherein a non-agglomerating particulate tracer is fed to the laser or other optical instrument with such a measuring wheel particle feeder.

When a non-agglomerating particular tracer material is fed with the measuring wheel particle feeder for optical instrument, the feed rate can be critically controlled even when the tracer has a large particle size distribution and is morphologically divergent as it is the case with the conventional tracer particles. Thus, the conventional non-agglomerating tracer particles are generally large in particle size and high in bulk specific gravity so that they cannot faithfully follow the fluid flow but when this measuring wheel particle feeder is employed, a better tracking performance can be obtained for enhanced measuring efficiency under conditions of high flow rate and least turbulence.

BRIEF DESCRIPTION OF THE PREFERRED EMBODIMENTS

FIG. 21 is a diagram showing the data obtained in Example 3, Comparative Example 2 and Comparative Example 3.

PREFERRED EMBODIMENTS OF THE INVENTION

Figure 1:
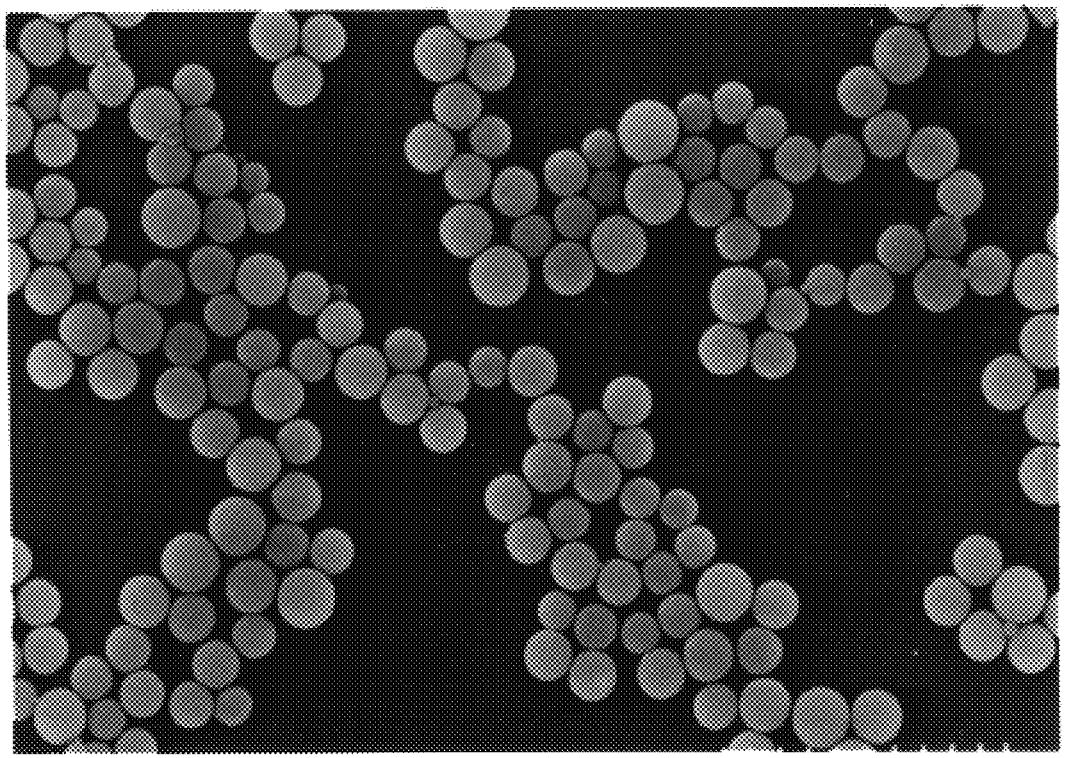
FIG. 1 is an electron microphotograph (×2,000) showing the particles manufactured in accordance with Production Example 1.

The following examples are further illustrative but not limitative of the invention.

EXAMPLE 1

Using a hollow spherical particulate $SiO_2$ tracer with 70% of individual particles having diameters within the range of mean particle diameter=1.5 μm±0.4 μm, the shell thickness of which is one-fifth of the diameter of the particle, the velocity of air within a cylinder was measured using a laser velocimeter under the following conditions and the relationship between the sample data rate and the mean effective data rate was investigated. Thus, for increasing the number of data per unit time (sample data rate) stepwise, the flow rate was increased stepwise (with the concentration of tracer particles kept constant) to increase the quantity of particles passing through the inference figure at the flowmeter. Of the resulting data, the percentage of data useful for velocity assessment (effective data rate) was determined. (Mean flow rate =ca. 20 m/min.)

1. Instrument: Fiber type laser Doppler velocimeter (FLDV)
    (cf. Ikeda, Y., Hikosaka, M., Ohira, T., and Nakajima, T., Scavenging Flow Measurements in a Fired Two-Stroke Engine by FLDV., 1991. SAE Paper No. 910, p.670)
    (Specification)
    Laser: He—Ne laser
    Laser power: 8 mW×2
    Lens diameter: 55 mm
2. Measuring conditions:
    Center frequency: 20 MHz
    Band width: ±16 MHz Effective sample number: 5,000

Signal gain: 24 dB

Photomultiplier voltage: 760 V

The results are shown in Table 1.

[The mean effective data rate was determined with Dantec's burst signal analyzer. When the symmetry of scatter signals is disturbed, the peak frequency value after Fourier transformation is depressed. Therefore, only the signals with a frequency peak/reference frequency peak ratio over a given value were regarded as valid data. In other words, the data lacking in signal symmetry were invalidated.]

TABLE 1

| Sample data rate (Hz) | Mean effective data rate (%) |
|---|---|
| 300 | 82 |
| 600 | 80 |
| 900 | 75 |
| 1,200 | 70 |
| 1,500 | 73 |
| 1,800 | 75 |

It will be apparent from Table 1 that increasing the sample data rate does not result in any appreciable decreases in the mean effective data rate which is a representative indicator of measurement accuracy, indicating that the tracer particles of the invention are fully effective for the measurement of high-velocity fluids.

EXAMPLE 2

The same measurement as Example 1 was performed using a hollow spherical particulate $SiO_2$ tracer with 90% of individual particles having diameters within the range of 1 to 5 $\mu$m (the shell thickness was one-fifth of the diameter of the particle). The results are shown in Table 2.

TABLE 2

| Sample data rate (Hz) | Mean effective rdata rate (%) |
|---|---|
| 300 | 80 |
| 600 | 79 |
| 900 | 55 |
| 1,200 | 60 |
| 1,500 | 65 |
| 1,800 | 57 |

It will be seen from Table 2 that although the mean effective data rates are not as high as those obtained in Example 1 because of the broader tracer particle size distribution, there are obtained stable effective data rates even at high sample data rates.

COMPARATIVE EXAMPLE 1

Figure 3:
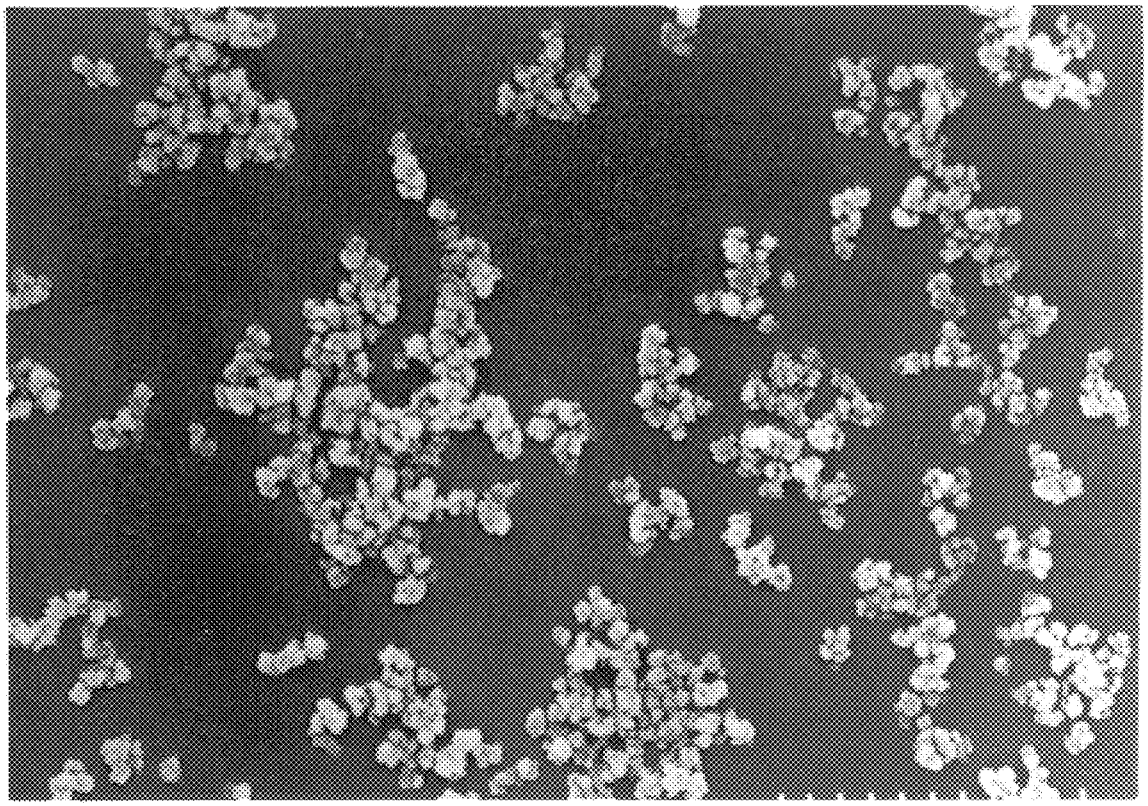
FIG. 3 is an electron microphotograph (×10,000) showing the conventional particles (white carbon)
Figure 4:
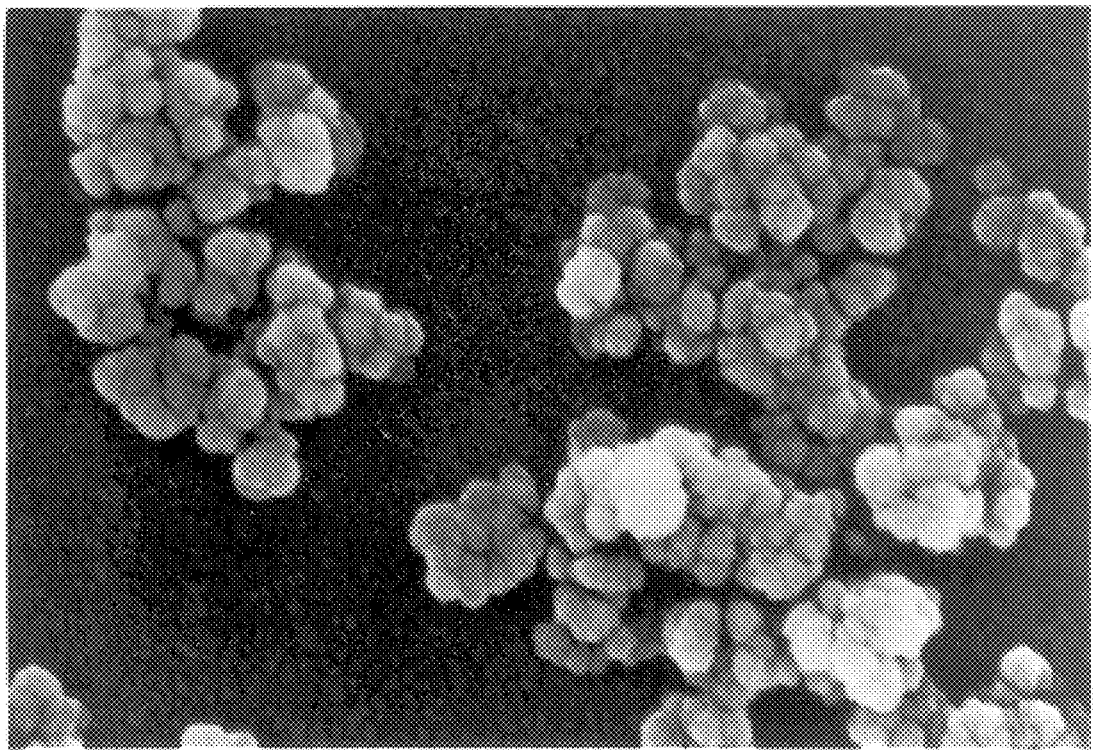
FIG. 4 is an electron microphotograph (×50,000) showing the same conventional particles (white carbon)

The same experiment as Example 1 was performed using a wet-process white carbon, shown in FIGS. 3 and 4, which is a representative prior art tracer (mean primary particle diameter 0.2 $\mu$m, mean agglomerated particle diameter (effective particle diameter) 6 $\mu$m; NIPSIL SS-50F, manufactured by Nippon Silica Industry Co., Ltd.). The results are shown in Table 3.

TABLE 3

| Sample data rate (Hz) | Mean effective data rate (%) |
|---|---|
| 300 | 53 |
| 600 | 63 |

TABLE 3-continued

| Sample data rate (Hz) | Mean effective data rate (%) |
|---|---|
| 900 | 20 |
| 1,200 | 15 |
| 1,500 | 12 |
| 1,800 | 5 |

It will be apparent from Table 3 that the mean effective data rates are invariably lower than the rates obtained in Examples 1 and 2, with extremely low rates found at high sample data rates.

It is predictable that the use of the prior art tracer particles shown in FIGS. 5 through 14 will also yield results similar to those described above for white carbon.

EXAMPLE 3 COMPARATIVE EXAMPLES 2 AND 3

Figure 2:
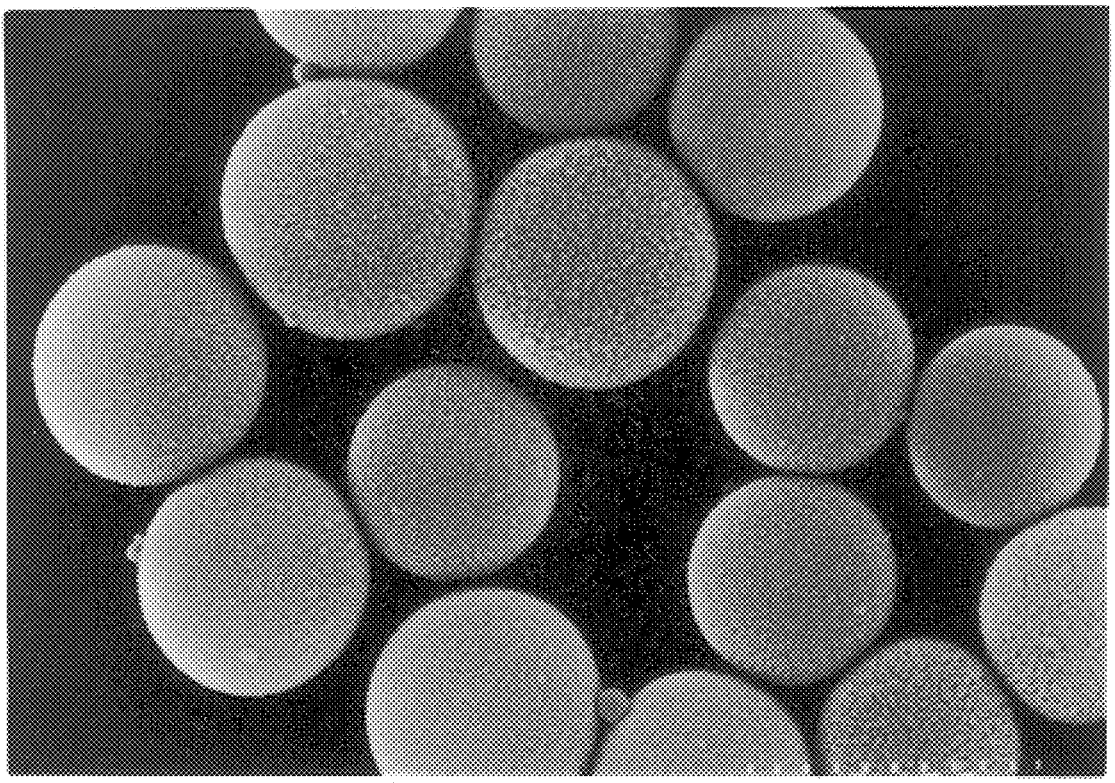
FIG. 2 is an electron microphotograph (×10,000) showing the particles manufactured in Production Example 1.
Figure 5:
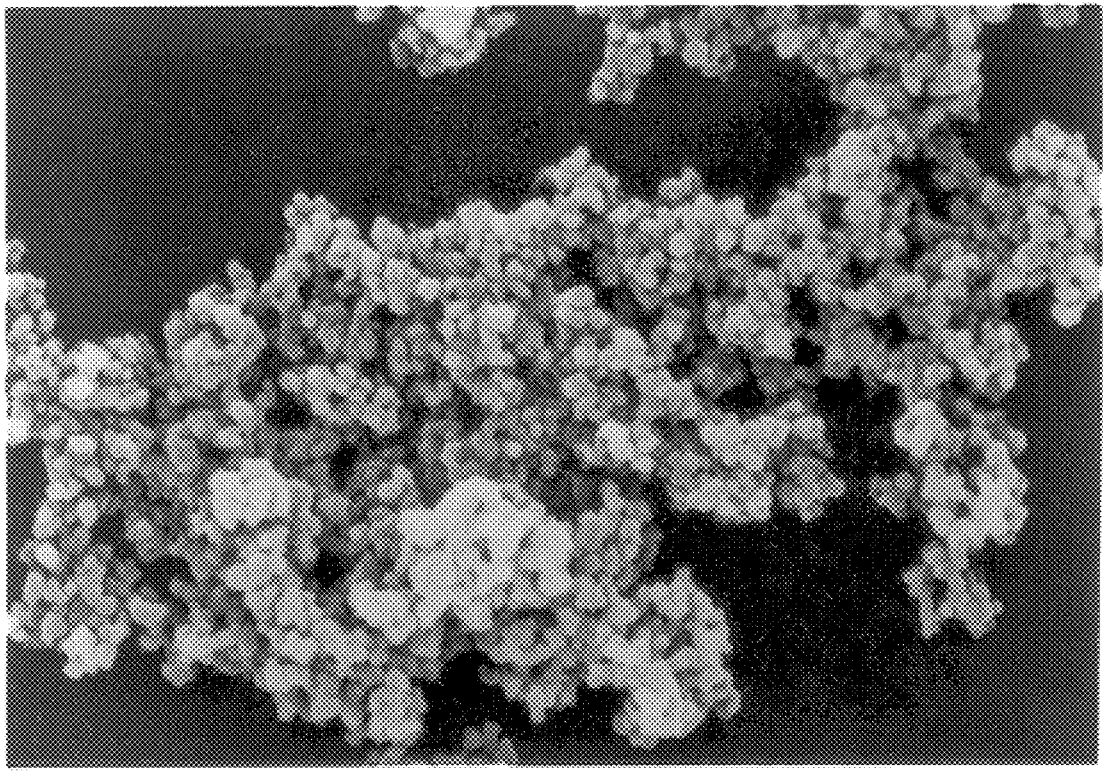
FIG. 5 is an electron microphotograph (×10,000) showing the conventional particles ($TiO_2$)
Figure 6:
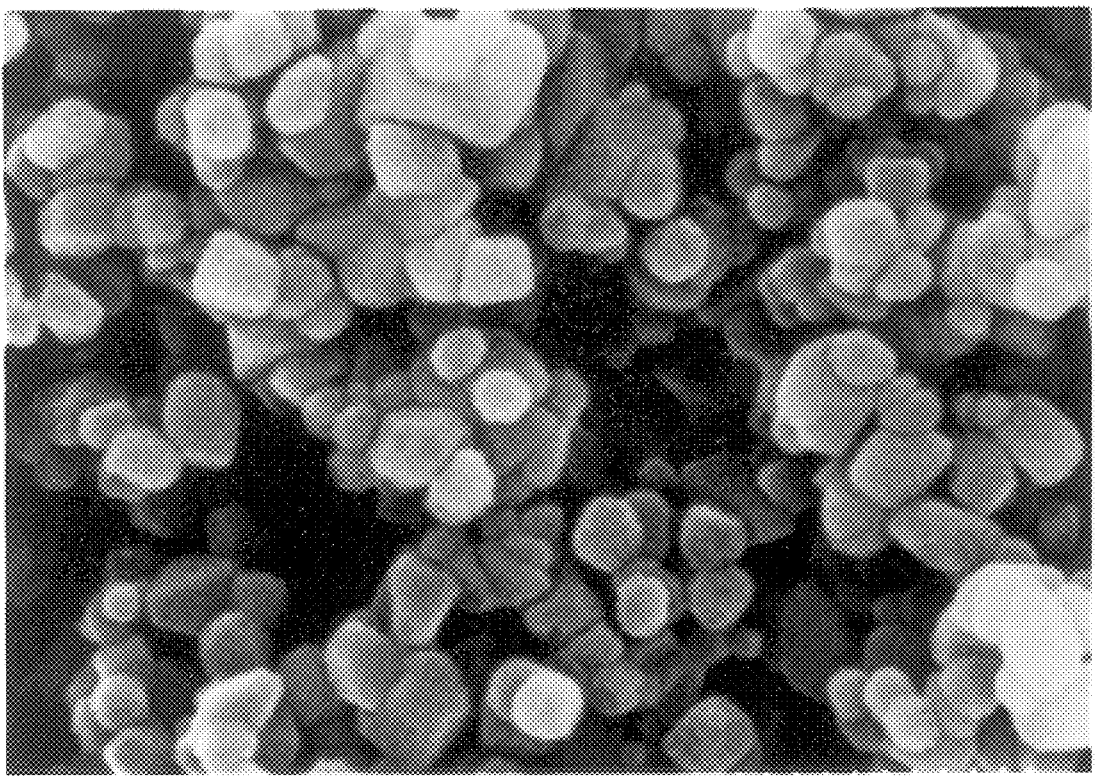
FIG. 6 is an electron microphotograph (×50,000) showing the same conventional particles ($TiO_2$)
Figure 7:
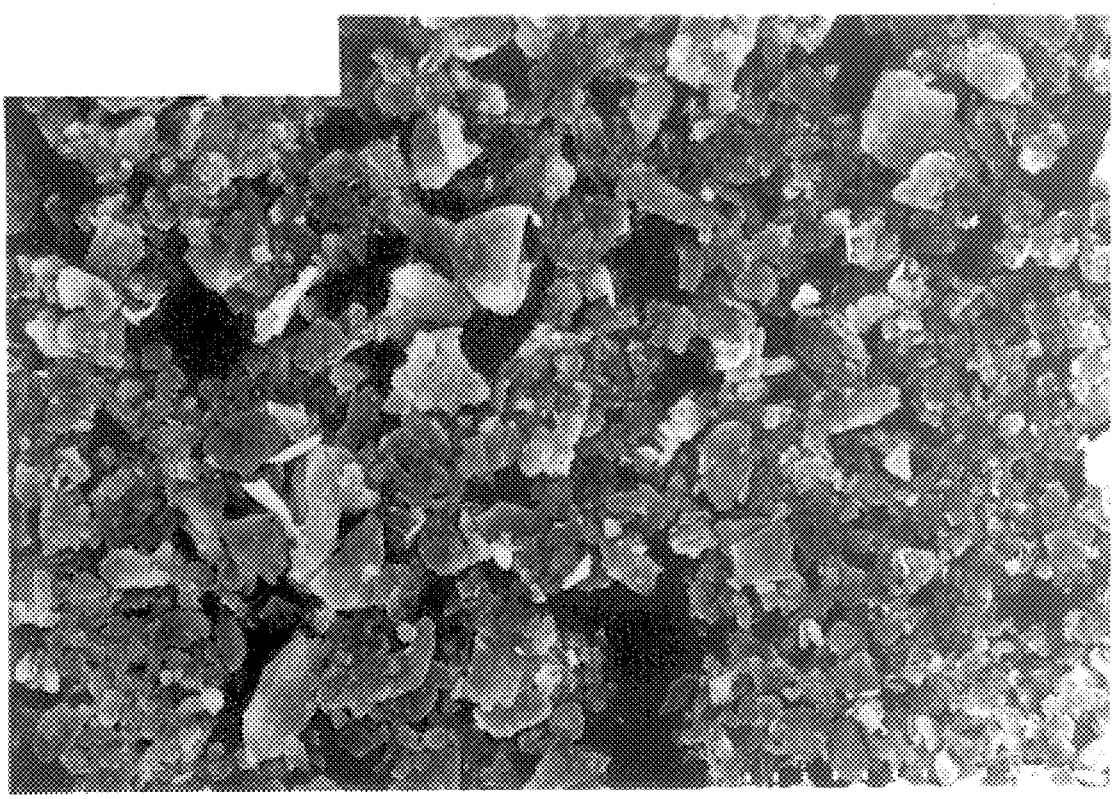
FIG. 7 is an electron microphotograph (×1,000) showing the conventional particles (talc)
Figure 8:
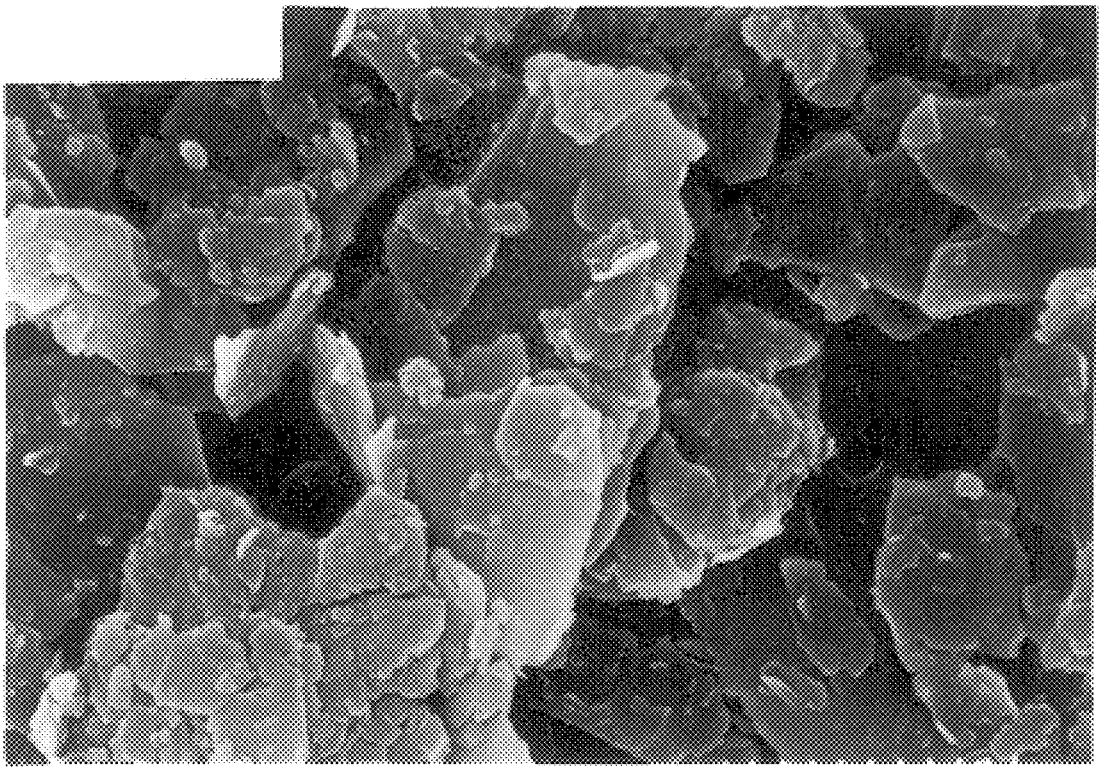
FIG. 8 is an electron microphotograph (×10,000) showing the same conventional particles (talc)
Figure 9:
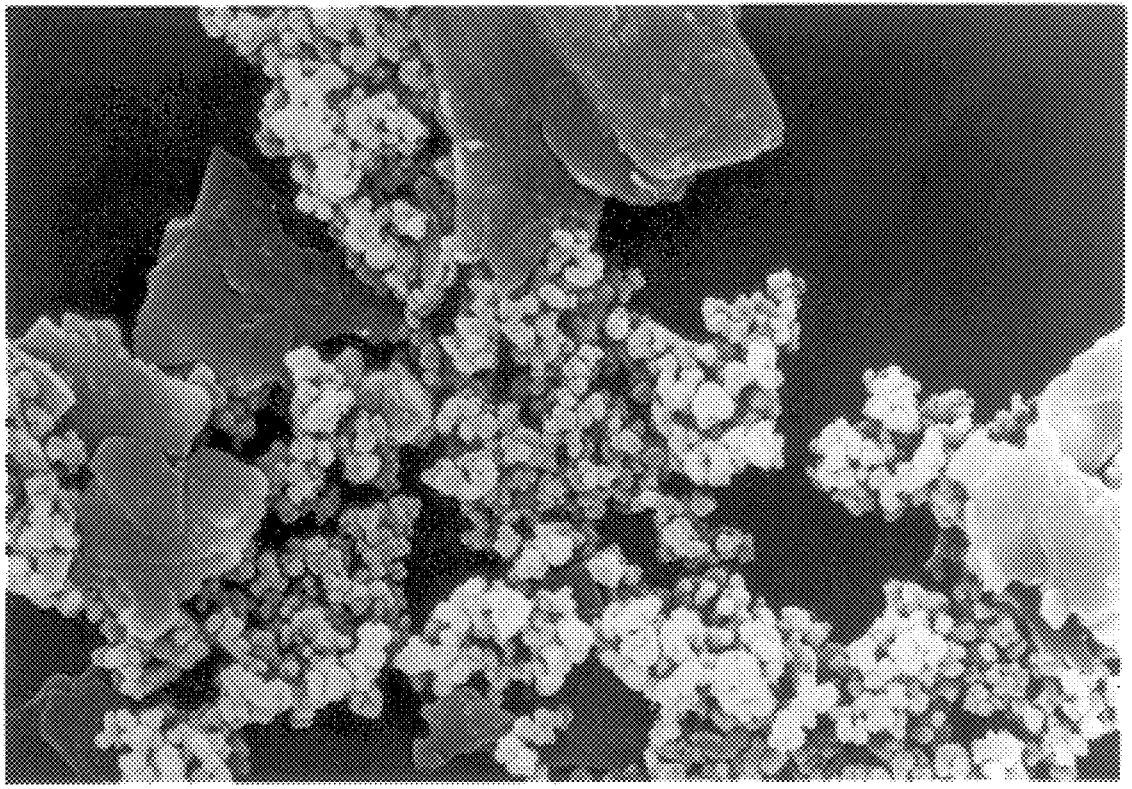
FIG. 9 is an electron microphotograph (×10,000) showing the conventional particles ($TiO_2$-talc)
Figure 10:
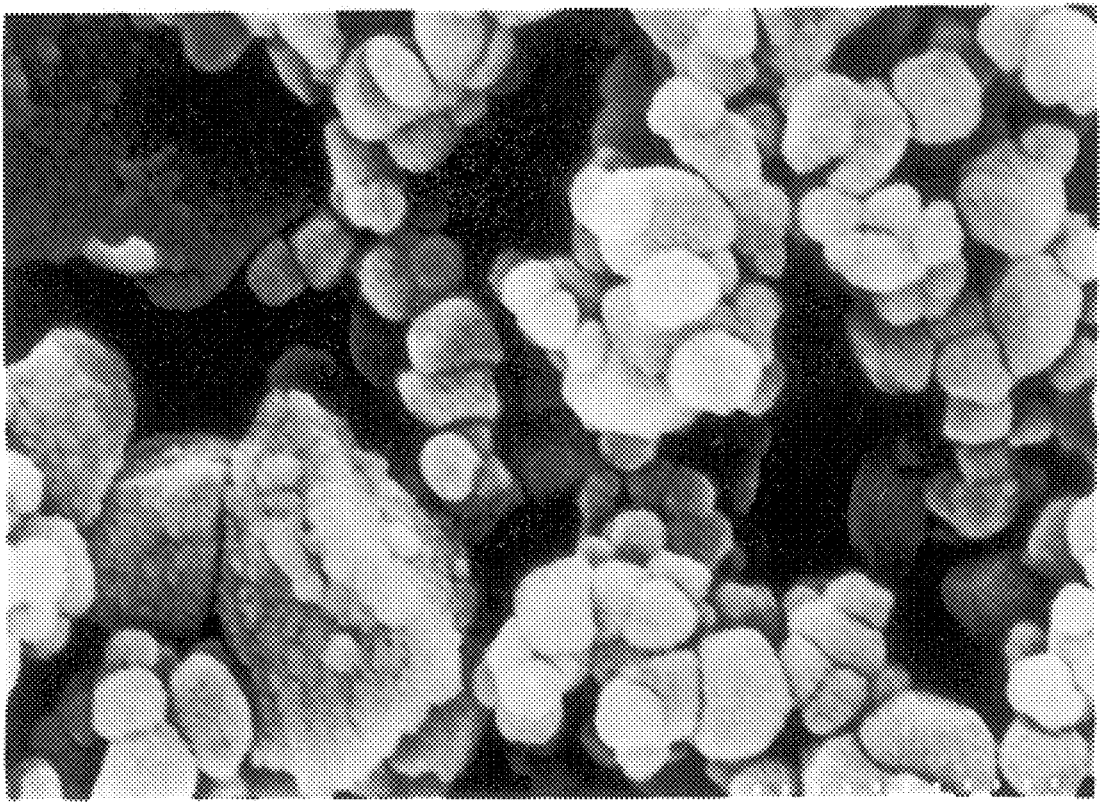
FIG. 10 is an electron microphotograph (×50,000) showing the same conventional particles ($TiO_2$-talc)
Figure 11:
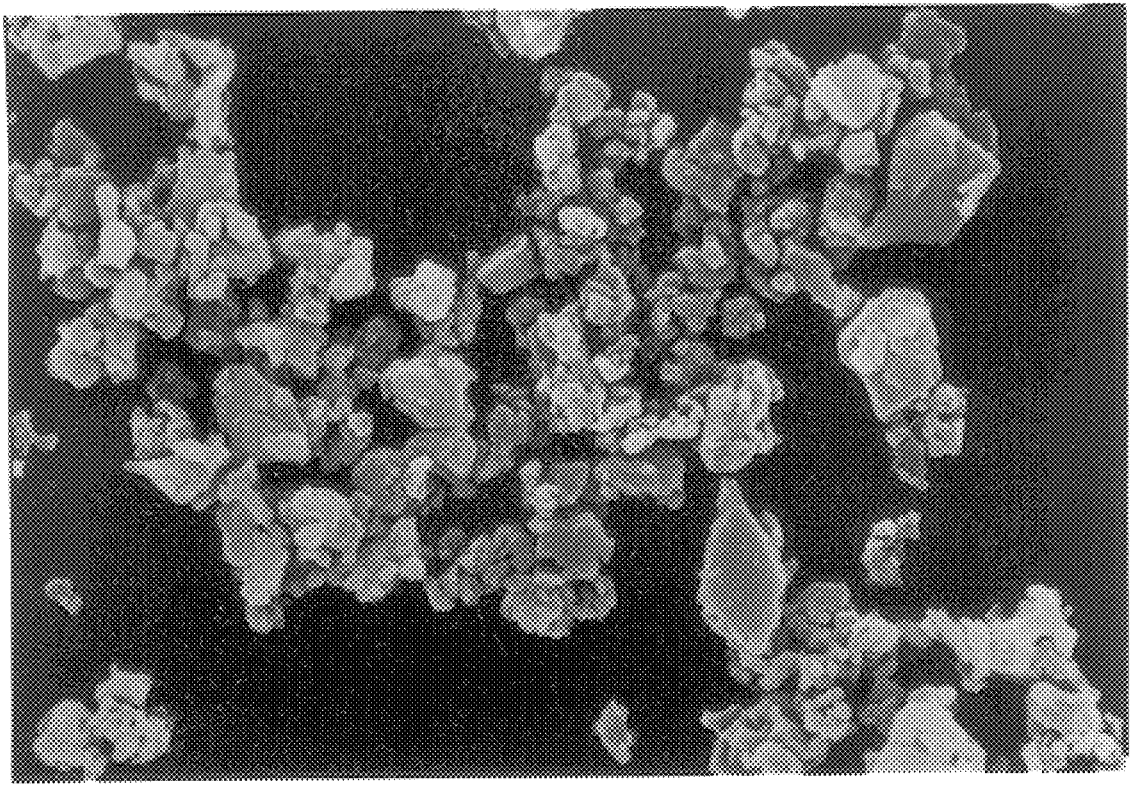
FIG. 11 is an electron microphotograph (×10,000) showing the conventional particles (source: Kanto loam)
Figure 12:
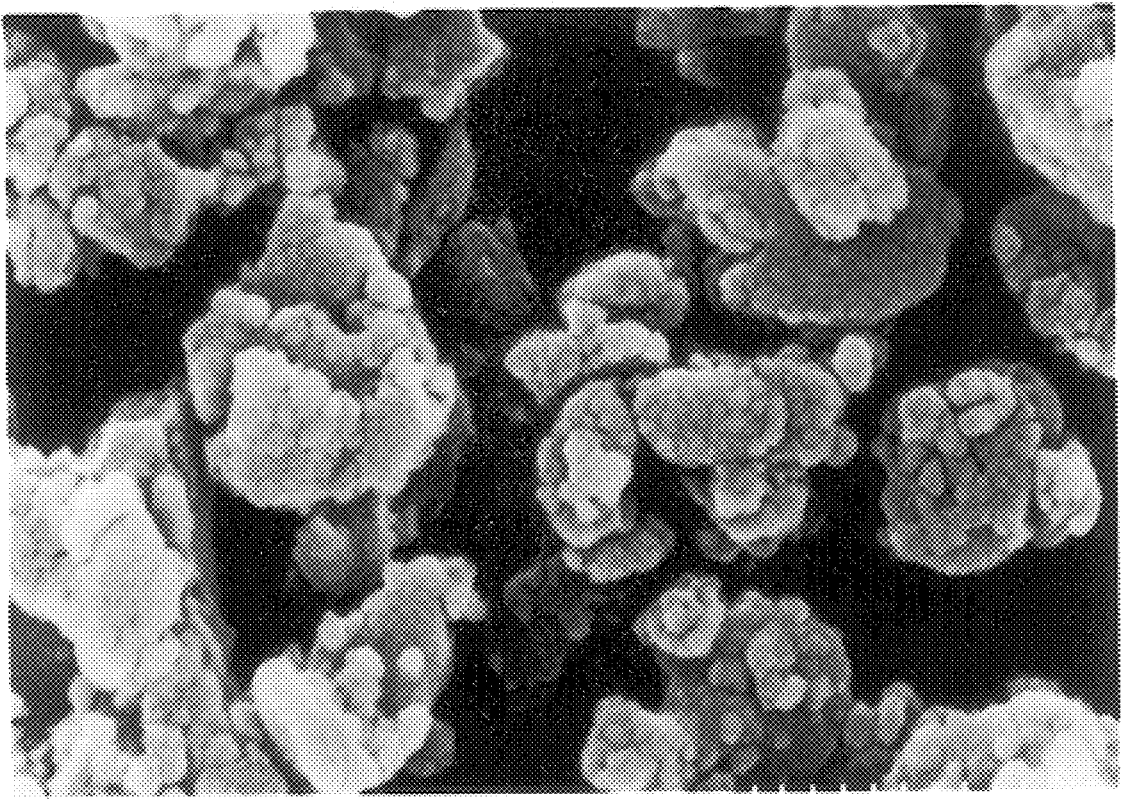
FIG. 12 is an electron microphotograph (×50,000) showing the same conventional particles (source: Kanto loam)
Figure 13:
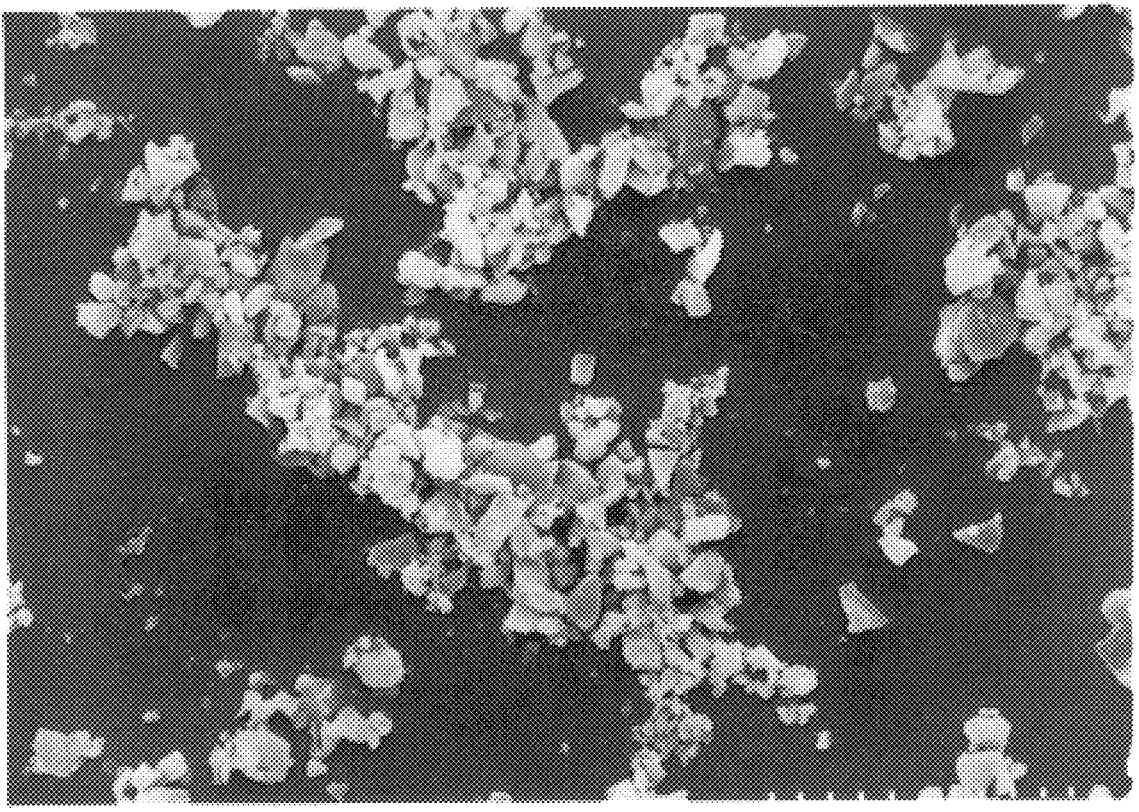
FIG. 13 is an electron microphotograph (×2,000) showing the conventional particles (fused white alumina)
Figure 14:
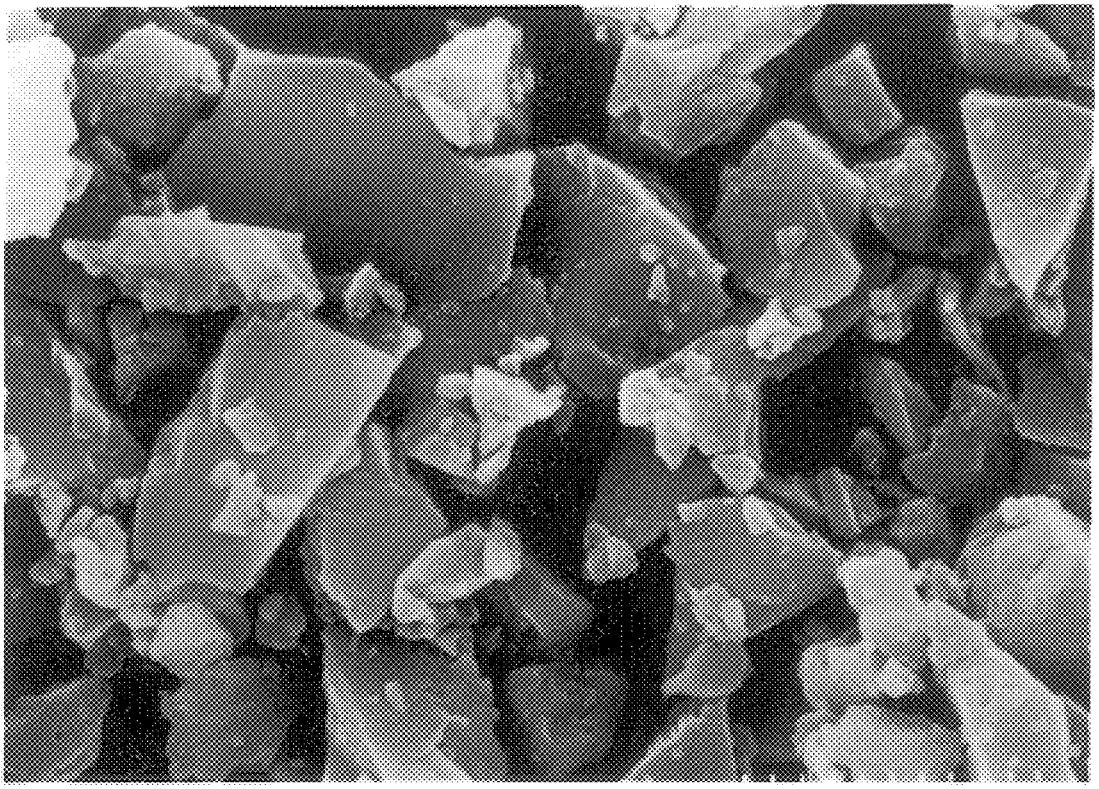
FIG. 14 is an electron microphotograph (×10,000) showing the same conventional particles (fused white alumina)
Figure 15:
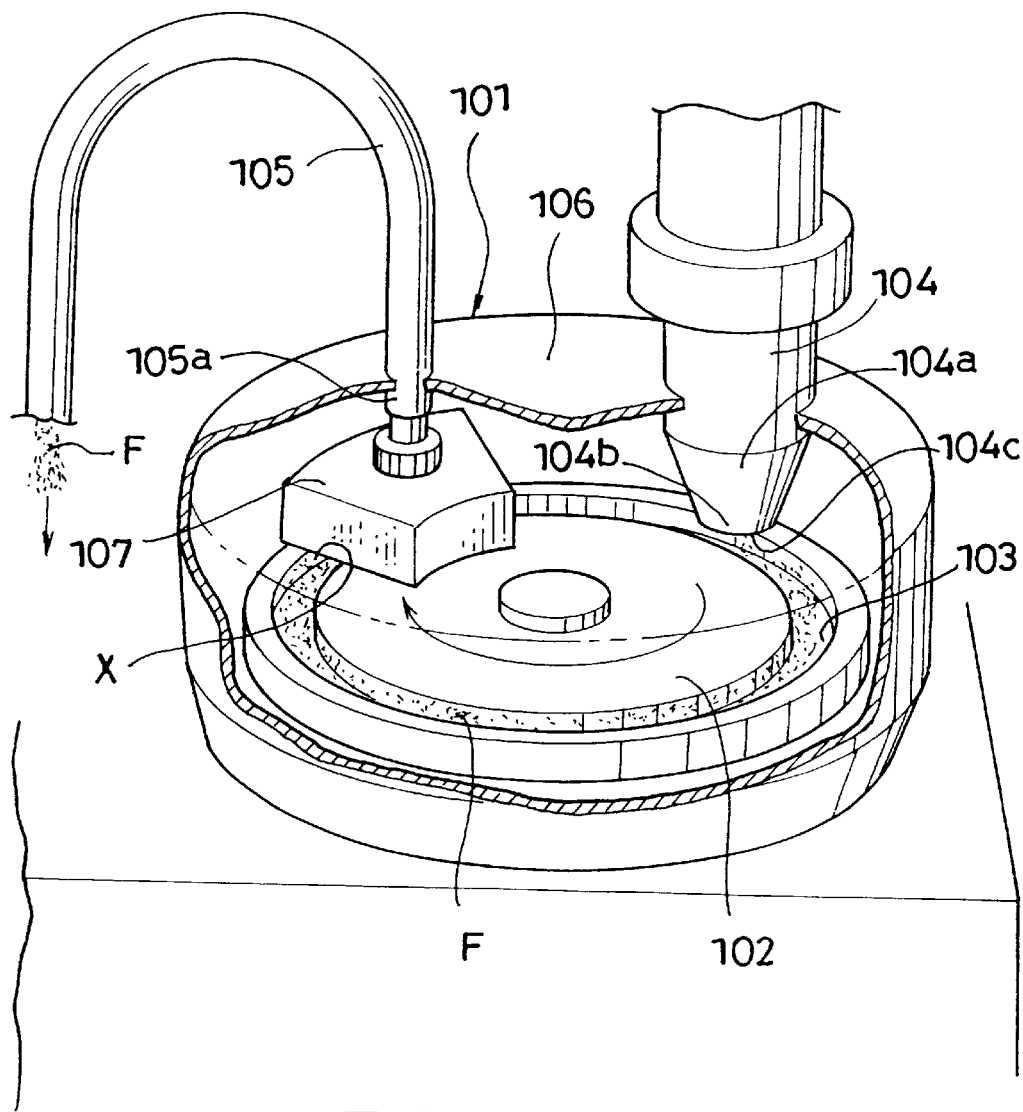
FIG. 15 is a perspective view showing a measuring wheel particle feeder.
Figure 16:
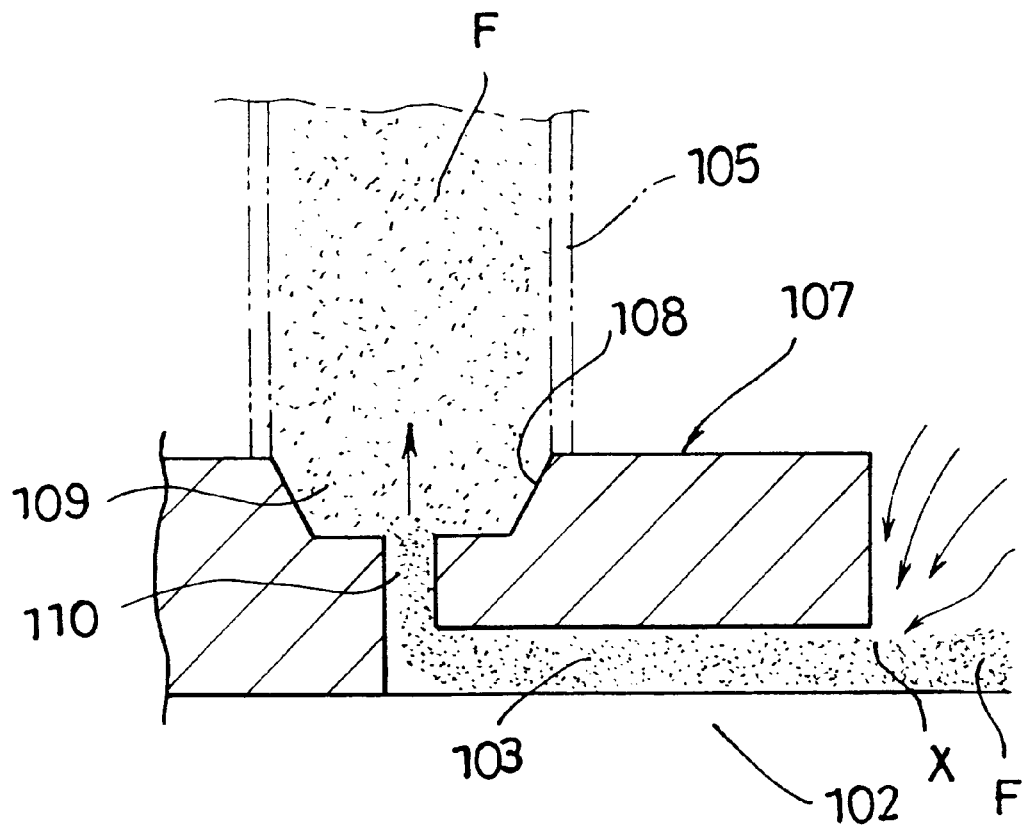
FIG. 16 is a partial longitudinal section view showing the blow nozzle of the feeder illustrated in FIG. 15.
Figure 18:
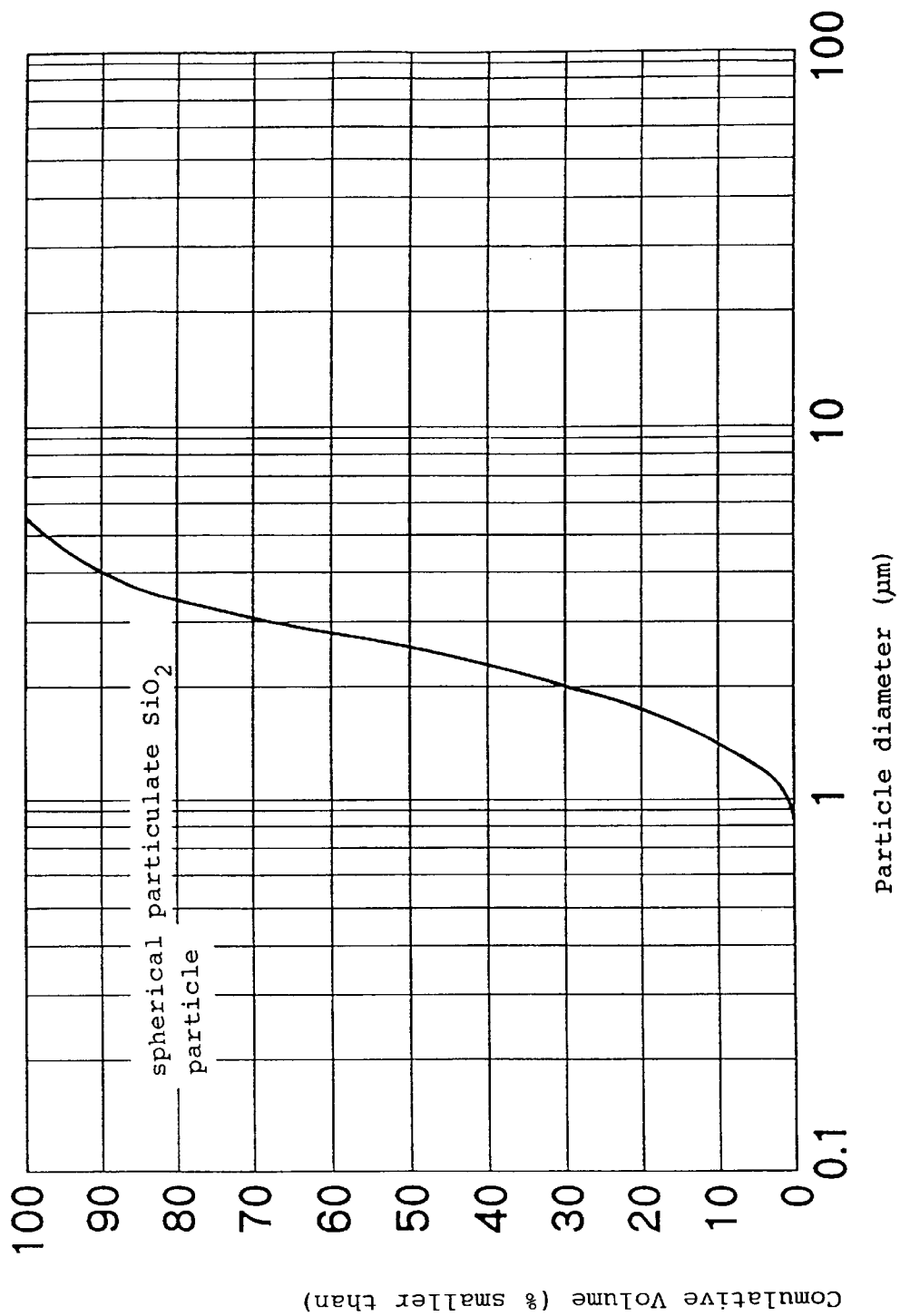
FIG. 18 is a diagrammatic representation of the particle diameter distribution of the spherical $SiO_2$ tracer used in Example 3.
Figure 19:
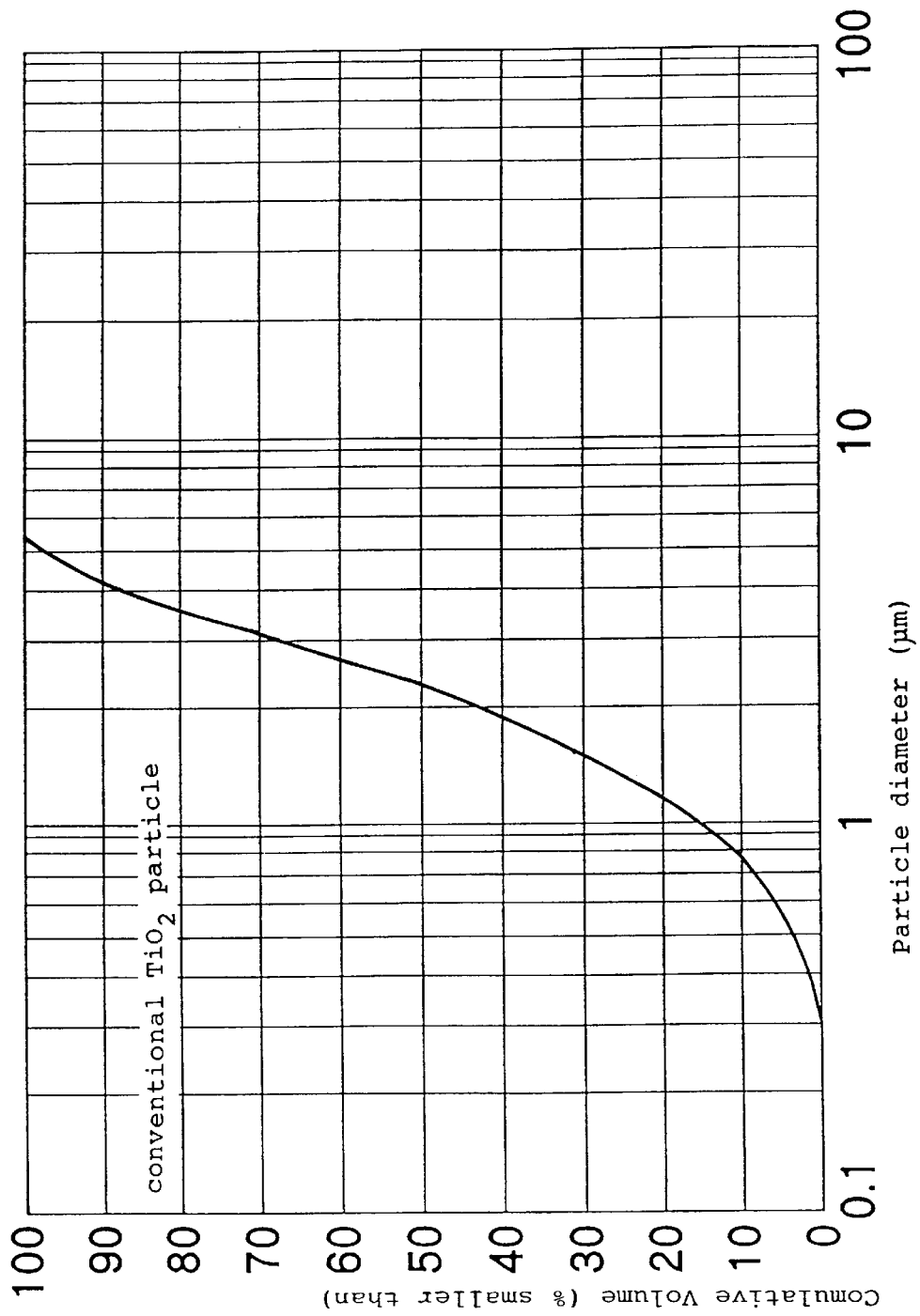
FIG. 19 is a diagrammatic representation of the particle diameter distribution of the $TiO_2$ tracer used in Comparative Example 2.
Figure 20:
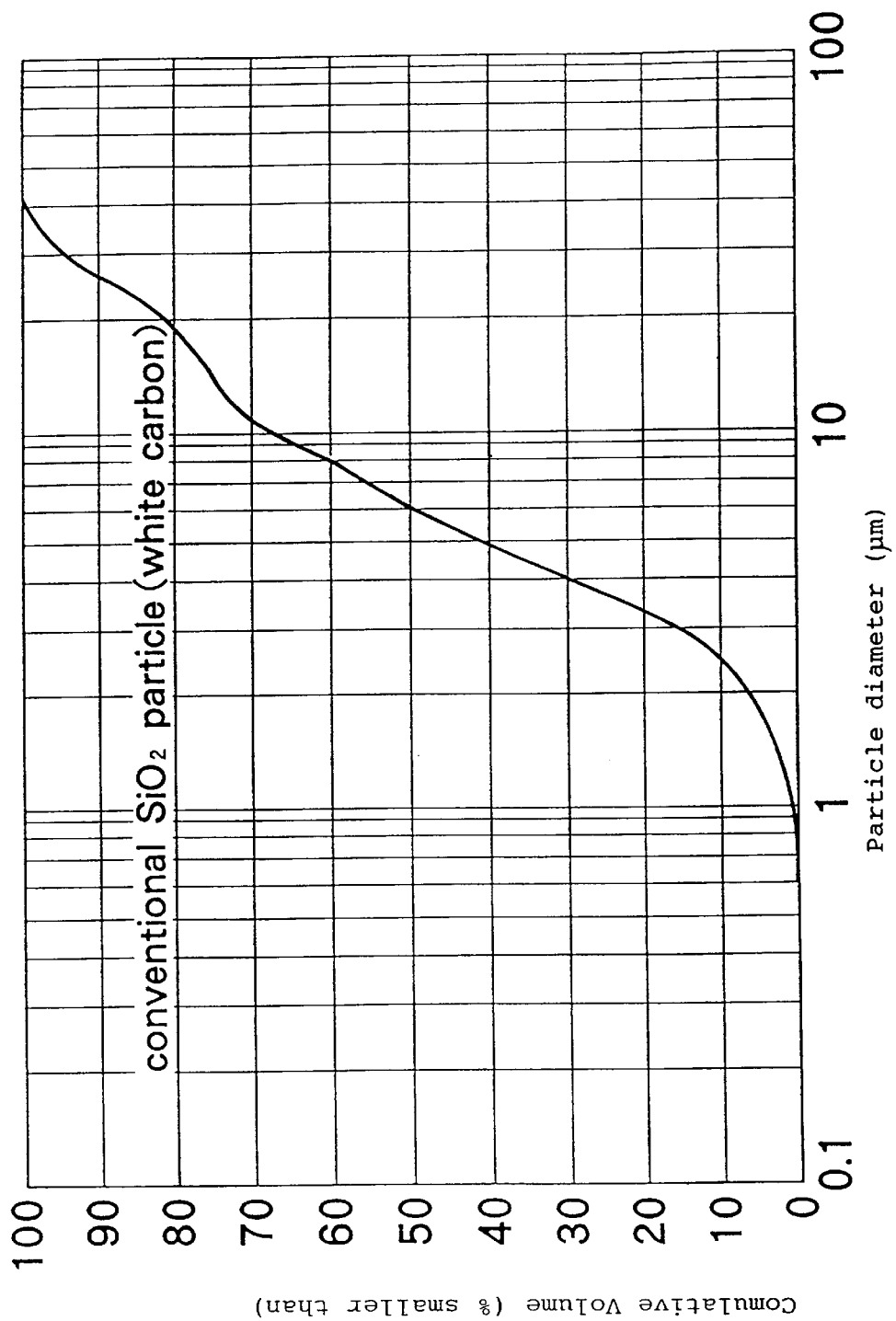
FIG. 20 is a diagrammatic representation of the particle diameter distribution of the $SiO_2$ tracer used in comparative Example 3.

The velocity of a fluid flowing through an acrylic resin pipe with an internal diameter of 100 mm was determined using: a spherical particulate $SiO_2$ tracer having the particle diameter distribution of FIG. 18 (Example 3; FIGS. 1 and 2), a particulate $TiO_2$ tracer having the particle diameter distribution of FIG. 19 (Comparative Example 2; FIGS. 5 and 6) and a particulate $SiO_2$ tracer having the particle diameter distribution of FIG. 20 (Comparative Example 3; FIGS. 3 and 4). For determinations, the same fiber type laser Doppler velocimeter (FLDV) as used in Example 1 was employed. A measuring wheel particle feeder (MSF-F, Liquid Gas Co., Ltd.) was used to supply said spherical particulate $SiO_2$ particle and a fluidize bed feeder (Durst et al., 1976) was used to supply said conventional $TiO_2$ and $SiO_2$ particles.

In each determination, the sample data rate was varied by changing the concentration of tracer particles. The same average measuring speed and root mean square velocity (r.m.s.v.), 122 m/s and 3.5 m/s, respectively, were used for the three tracers.

The relationship between sample data rate and effective data rate is diagrammatically shown in FIG. 21.

It will be apparent from FIG. 21 that, in accordance with the present invention, the effective data rate is not decreased even if the number of data per unit time is increased by increasing the feed rate of particles.

Production Example 1

The following example is intended to illustrate the production of tracer particles by the reversed micelle method.

A 10 $\mu$m-thick polyimide film was irradiated with a KrF excimer laser (wavelength 251 nm) to provide perforations sized 2.0 $\mu$m. This perforated polymer film was mounted in an emulsification device illustrated in FIG. 17 and an aqueous solution of the tracer precursor substance was fed under pressure into an organic solution with a syringe pump. The feeding rate was 1 g/cm$^2$ and the temperature was 25° C.

Figure 17:
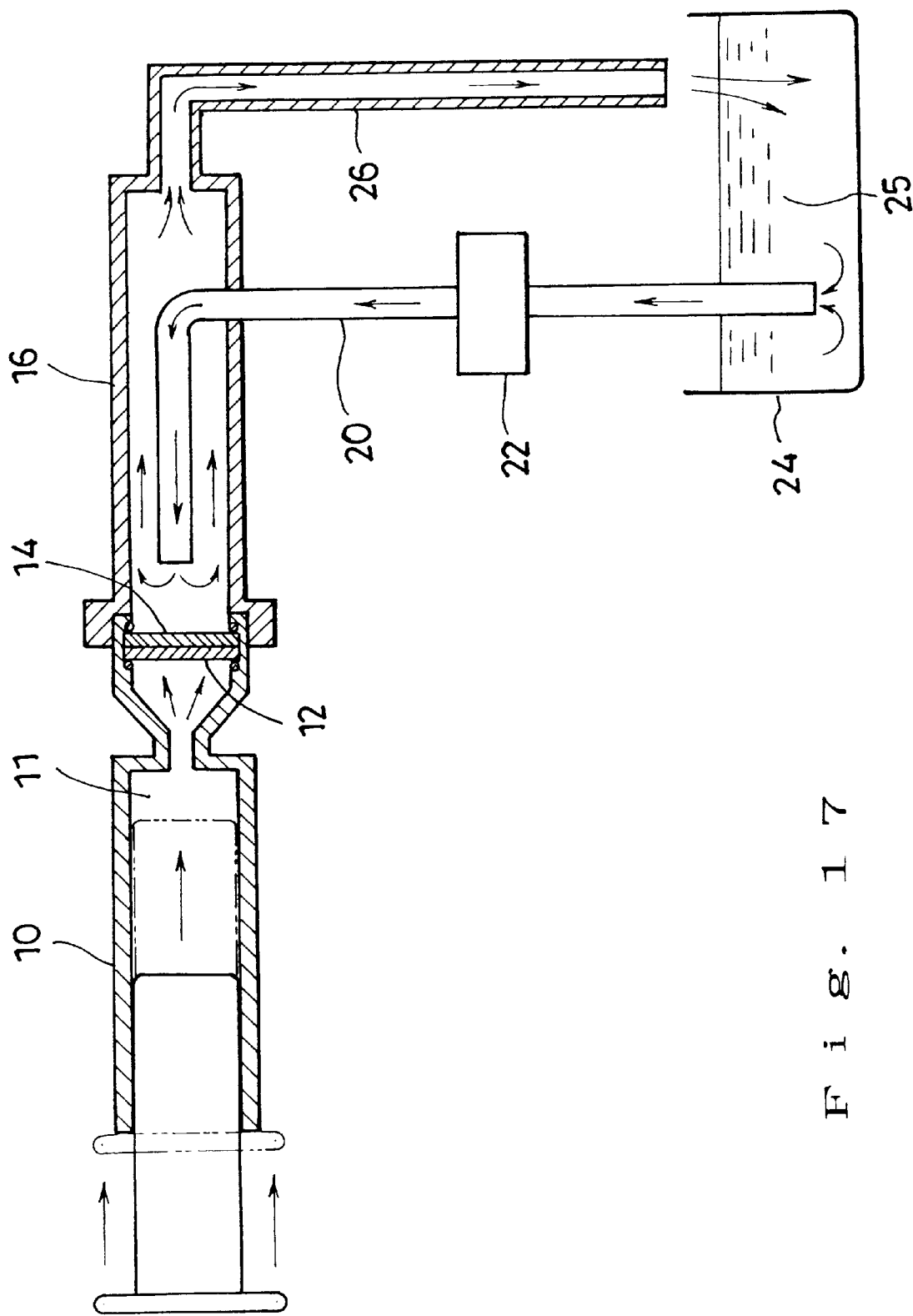
FIG. 17 is a schematic view illustrating the manufacturing equipment for tracer particles.

The construction of the device shown in FIG. 17 is summarized below. The reference numeral 10 indicates a volumetric syringe pump 10. The polymer membrane, indicated by 12, is mounted in the forward portion of the volumetric syringe pump. The reference numeral 14 indicates a screen for supporting said polymer membrane. Indicated by the numeral 16 is a cylindrical reactor which is communicating with said syringe pump 10. The reference numeral 20 indicates a feed pipe for feeding an organic solvent 25 from a solvent beaker 24 to said reactor 16 through a metering pump 22. Now, an aqueous solution 11 of the tracer particle precusor substance is quantitatively injected into the organic solvent 25 within the reactor 16 by said syringe pump 10. After formation of a large number of emulsion particles, the organic solvent is returned from the reactor 16 to the solvent beaker 24 via a withdrawal pipe 26.

In the example, a hexane solution of polyoxyethylene (20)-sorbitan trioleate (20 g/l) was used as the organic solvent.

As to the aqueous solution, a solution prepared by adding 1.0 mol of tetraethoxysilane, 2.2 mol of methanol, 1.0 mol of N,N-dimethylformamide and $4 \times 10^{-4}$ mols of ammonia to 10 mols of water was employed.

After emulsification at 5° C., the slurry was refluxed for 30 hours and the resulting emulsion particles (sol) in the organic acid were precipitated by gelation. The precipitate was dried and heated at 800° C. to give a silica ($SiO_2$) tracer uniform in particle diameter. The silica tracer particles thus obtained were spherical particles, 70% of which had diameters in the range of mean diameter=$2.5 \pm 0.7$ μm (FIGS. 1 and 2).

EXAMPLE 4

For comparing the measuring accuracy obtainable with spherical tracer particles with that obtainable with hollow spherical tracer particles, the same experiment as Example 1 was performed using the solid spherical particles prepared in Production Example 1, that is the particles with 70% having diameters within the range of mean=$2.5 \pm 0.7$ μm. The results are shown in Table 4.

TABLE 4

| Sample data rate (Hz) | Mean effective data rate (%) |
| --- | --- |
| 300 | 81 |
| 600 | 80 |
| 900 | 74 |
| 1,200 | 73 |
| 1,500 | 63 |
| 1,800 | 65 |

Comparison of Table 4 with Table 1 indicates that both at low velocity (low sample data rate) and high velocity (high sample data rate), high measurement accuracy values are obtained and that particularly at high velocity, the hollow spherical tracer particles yield a higher measurement accuracy than the solid spherical tracer particles, even when the minor difference in particle size is taken into consideration.

EXAMPLE 5 AND COMPARATIVE EXAMPLE 4

Using the conventional particulate $TiO_2$ tracer for fluid visualization having a mean particle diameter of 5 μm and a particle specific gravity of 6 g/cm$^3$ (Comparative Example 4) and a porous spherical particulate $SiO_2$ tracer having a mean particle diameter of 30 μm and a particle specific gravity of about 1 g/cm$^3$ which is substantially comparable to the first-mentioned tracer in average fluid tracking performance (Example 5, 72% within the range of mean particle diameter ±50%), a fluid visualization test was performed by the photographing method using a flash lamp as the light source.

As a result, the mean reflection light quantity per particle was about 20 times the value of the conventional tracer.

In terms of the width of spread of particles in the laminar flow region, the porous spherical particles showed values about 0.8 to 0.5 times the values of the conventional particles.

It is easy to see that, with the average fluid-tracking performance being fixed, the larger the reflection light quantity, i.e. the signal quantity, and the narrower the spread of tracer particles in the laminar flow region, the higher is the measurement accuracy.

It is easily predictable that similar results will be obtained when the conventional tracer particles illustrated in FIGS. 5 through 14 are used in lieu of the above tracer particles of Comparative Example 4.

EXAMPLE 6 AND COMPARATIVE EXAMPLE 5

The same visualization test as above was performed using, instead of the porous spherical particulate $SiO_2$ tracer with a mean particle diameter of 30 μm, a porous spherical particulate $SiO_2$ tracer with a mean particle diameter of 100 μm (Example 6; 72% of particles within the range of mean±50%) and a conventional particulate $TiO_2$ tracer for fluid visualization which is comparable to the first-mentioned tracer in fluid tracking performance (Comparative Example 5).

Like the tracer of Example 5, the porous spherical $SiO_2$ tracer having a mean particle diameter of 100 μm was superior to the conventional tracer in average reflection light quantity and in terms of the width of spread of particles in the laminar flow region.

EXAMPLE 7

Using the spherical particles manufactured in Production Example 1, namely a spherical particulate $SiO_2$ tracer with 70% of particles having diameters within the range of $2.5 \pm 0.7$ μm (FIGS. 1 and 2) and the same laser Doppler velocimeter as used in Example 1, the velocity of water flowing in a turbulent flow within a pipe of circular section was determined and the relationship between sample data rate and mean effective data rate was investigated. Thus, the flow rate was increased stepwise to increase the number of data per unit time (sample data rate) and, hence, the quantity of particles passing through the fringe in the velocimeter, with the concentration of particles being kept constant. Of the data thus generated, the percentage of the data useful for velocity assessment (effective data rate) was determined.

1. Instrument: A fiber type laser Doppler velocimeter (FLDV)
   (Ikeda, Y., Hikosaka, M., Ohira, T., and Nakajima, T., Scavenging Flow Measurements in a Fired Two-Stroke Engine by FLDV. 1991, SAE Paper No. 910670.)
   (Specification)
   Laser: He—Ne laser
   Laser power: 8 mW×2
   Lens diameter: 55 mm
2. Measuring conditions:
   Center frequency: 20 MHz
   Band width: ±16 MHz
   Effective sample number: 5,000
   Signal gain: 24 dB
   Photomultiplier voltage: 60 V
   The results are shown in Table 5.

TABLE 5

| Sample data rate (Hz) | Mean effective data rate (%) |
| --- | --- |
| 1,000 | 72 |
| 2,000 | 69 |
| 3,000 | 70 |

COMPARATIVE EXAMPLE 6

Using the conventional particulate $TiO_2$ tracer with a mean particle diameter of 2 μm (FIGS. 5 and 6), the velocimetric test was performed under the same conditions as used in Example 7. The results are shown in Table 6.

TABLE 6

| Sample data rate (Hz) | Mean effective data rate (%) |
|---|---|
| 1,000 | 35 |
| 2,000 | 20 |
| 3,000 | 10 |

COMPARATIVE EXAMPLE 7

Using the conventional particulate SiC tracer with a mean particle diameter of 3 μm, the velocimetric test was performed under the same conditions as in Example 7. The results are shown in Table 7.

TABLE 7

| Sample data rate (Hz) | Mean effective data rate (%) |
|---|---|
| 1,000 | 50 |
| 2,000 | 42 |
| 3,000 | 37 |

It will be apparent from Tables 5 through 7 that, compared with the tracers of Comparative Examples 6 and 7, the tracer of Example 7 yields high effective data rates which are substantially constant up to a very high data rate.

EXAMPLES 8, 9, AND 10 AND COMPARATIVE EXAMPLES 8 AND 9

The five particulate tracers shown below in Table 8 were respectively immersed in water for a predetermined time and the bulk specific gravity of each wet tracer was determined. The results are also shown in Table 8.

TABLE 8

| Particulate tracer | Bulk specific gravity |
|---|---|
| [Example 8]<br>Porous spherical SiO$_2$ particles, closed pore 0.05 cm$^3$/g, mean particle diameter 2.7 μm | 1.45 g/cm$^3$ |
| [Example 9]<br>Porous spherical SiO$_2$ particles, closed pore 0.21 cm$^3$/g, mean particle diameter 2.8 μm | 1.20 g/cm$^3$ |
| [Example 10]<br>Porous spherical SiO$_2$ particles, closed pore 0.15 cm$^3$/g, mean particle diameter 15 μm | 1.26 g/cm$^3$ |
| [Comparative Example 8]<br>Conventional SiC particles, mean particle diameter 3 μm | 2.3 g/cm$^3$ |
| [Comparative Example 9]<br>Conventional TiO$_2$ particles, mean particle diameter 2 μm | 3.1 g/cm$^3$ |

It is apparent from Table 8 that compared with the tracers of Comparative Examples 8 and 9, the tracers of Examples 8, 9 and 10 are smaller in the bulk specific gravity differential from water, suggesting the greater ease with which they may follow a water flow and that the tracer of Example 9 is particularly excellent.

Since the fluid-tracking performance is inversely proportional to the specific gravity differential from the fluid, the tracer of Example 10 is considered to be substantially equivalent to the tracer of Comparative Example 8 in tracking efficiency. However, because the sectional area of the tracer particle of Example 10 is approximately 25-fold greater, it is easy to anticipate that, in the photographing method, it produces a greater intensity of scattered light. The greater the intensity of scattered light, the higher is the measurement accuracy. In other words, the smaller the specific gravity differential from the fluid to be measured, the larger is the tracer particle that can be employed. Therefore, the fact that the tracer particle has closed pores and the specific gravity of the particle can be controlled by taking advantage of such closed pores has a great significance in a measuring system where the distribution of tracer particles is photographed using an instantaneous powerful light source such as a flashlight or a pulse laser.

EXAMPLE 11

A velocimetric test was performed using a metal-clad spherical particulate tracer prepared by depositing a nickel plate about 0.05 μm thick on the particles manufactured in Production Example 1 by the electroless plating technique. The test conditions were otherwise identical to those used in Example 7. The results are shown in Table 9.

TABLE 9

| Sample data rate (Hz) | Mean effective data rate (%) |
|---|---|
| 1,000 | 80 |
| 2,000 | 75 |
| 3,000 | 74 |

Comparison with Tables 5 through 7 and 9 indicates that the effective data rates in Example 11 are higher than those obtained in Example 7 and Comparative Examples 6 and 7.

EXAMPLE 12

Using a porous hollow spherical particulate SiO$_2$ tracer with a mean particle diameter of 1.5 μm±S.D. 0.3 μm, the shell thickness of which was one-fifth of the diameter of the particle, a comparative feeding test was performed with the measuring wheel particle feeder (MSF-F, Liquid Gas Co., Ltd.) and the screw feeder. In both cases, the feed rate was set at 0.3 g per minute.

The feeding accuracy was high for both the measuring wheel feeder and the screw feeder but with the measuring wheel feeder the tracer could be introduced with an accuracy of 0.3±0.01 g/min. This accuracy is about 5 times as high as the accuracy with the screw feeder.

In the measurement of fluid velocity with a laser instrument, it is easy to see that the higher the accuracy with which the tracer can be fed to the instrument and, hence, to the fluid to be measured, the higher is the accuracy of flow measurement by the instrument.

COMPARATIVE EXAMPLE 10

Using the conventional non-agglomerating particulate SiO$_2$ tracer with a mean particle diameter of 1.5 μm, a feeding test was performed with the measuring wheel particle feeder and the screw feeder. In both cases, the feed cate was controlled at 0.3 g per minute.

With the measuring wheel feeder, the tracer particles could not be successfully delivered due to agglomeration.

The feed accuracy with the screw feeder was 0.3±0.14 g/min and it was found that, compared with Example 12, the use of spherical tracer particles insures a comparatively higher accuracy of feeding to the laser instrument.

In the measurement of fluid flow with a laser instrument, it is easy to see that the higher the accuracy of feed to the fluid, the higher is the accuracy of measurement by the instrument.

EXAMPLE 13 AND COMPARATIVE EXAMPLE 11

Using the conventional non-agglomerating particulate $TiO_2$ tracer with a mean particle diameter of 5 µm, a feeding test was performed with the same measuring wheel particle feeder as used in Example 12 (Example 13) and the screw feeder (Comparative Example 11). In both cases, the feed rate was set at 0.3 g per minute.

The feeding accuracies were 0.3±0.02 g/min and 0.3±0.08 g/min, respectively, indicating that the measuring wheel particle feeder is conductive to a higher measurement accuracy.

What is claimed is:

1. A method of measuring the flow of a fluid using an optical instrument and a porous particulate ceramic tracer which comprises employing a spherical particulate tracer of a porous ceramic material and having a particle diameter within the range of 0.5 to 150 µm as said tracer.

2. A method of measuring the flow of a fluid involving measuring the velocity of tracer particles with a laser instrument such as a laser Doppler velocimeter, which comprises employing a spherical particulate tracer of a porous ceramic material with a particle diameter in the range of 0.5 to 10 µm as said tracer.

3. A method of measuring the flow of a fluid involving photographing of the distribution of tracer particles with an instantaneous power light source such as a flashlight or a pulse laser, which comprises employing a solid spherical particulate tracer of a porous ceramic material and having a particle diameter with the range of 5 to 150 µm.

4. A method of measuring the flow of a fluid according to claims 1 or 2 wherein said fluid to be measured is a gas and said particulate tracer is a hollow spherical particulate tracer.

5. A method of measuring the flow of a fluid according to claims 1, 2 or 3 wherein said fluid to be measured is a liquid and said particulate tracer is a porous particulate ceramic tracer having closed pores with a porosity of not less than 0.1 $cm^3/g$.

6. A method of measuring the flow of a fluid according to claims 1, 2 or 3 wherein said fluid to be measured is a liquid and said particulate tracer is a metal-clad ceramic tracer.

7. A method of measuring the flow of a fluid according to claim 6 wherein said metal-clad tracer is a tracer clad with a metal by electroless plating.

8. A method of measuring the flow of a fluid according to claim 7 wherein said metal is nickel.

9. A method of measuring the flow of a fluid according to claims 1, 2 or 3 wherein said ceramic is composed of $SiO_2$.

10. A method of measuring the flow of a fluid according to claims 1, 2 or 3 wherein not less than 70% of particles constituting said particulate ceramic tracer have diameters within the range of the mean particle diameter ±50%.

11. A method of measuring the flow of a fluid according to claims 1, 2 or 3 wherein said particulate ceramic tracer or the ceramic part of said metal-clad tracer has been produced by the reversed micelle process.

12. A method of measuring the flow of a fluid according to claim 11 wherein said particulate ceramic tracer or said ceramic part of said metal-clad ceramic tracer has been produced by extruding an aqueous solution of a precursor material for said tracer or ceramic part from a porous glass or polymer membrane having pores substantially uniform in size into an organic solvent to form reversed micelles.

13. A method of measuring the flow of a fluid according to claims 1, 2 or 3 wherein said particulate ceramic tracer is fed to said fluid by means of a measuring wheel particle feeder.

14. A method of measuring fluid flow comprising the steps of:

feeding a non-agglomerating particulate tracer from a measuring wheel particle feeder to an optical instrument;

said feeding of non-agglomerating particulate tracer including feeding said non-agglomerating particulate tracer at a substantially continuous rate; and said feeding of non-agglomerating particulate tracer including applying atmospheric pressure greater than an external atmospheric pressure to a chamber of said measuring wheel particle feeder to effect feeding of said non-agglomerating particulate tracer to said optical device.

15. A method of measuring fluid flow comprising the steps of:

feeding a non-agglomerating particulate tracer from a measuring wheel particle feeder to an optical instrument; and said feeding of non-agglomerating particulate tracer including applying atmospheric pressure greater than an external atmospheric pressure to a chamber of said measuring wheel particle feeder to effect feeding of said non-agglomerating particulate tracer to said optical device.

* * * * *